(12) United States Patent
Stehr et al.

(10) Patent No.: US 11,359,720 B2
(45) Date of Patent: Jun. 14, 2022

(54) HYDRAULIC SYSTEM

(71) Applicant: Schaeffler Technologies AG & Co. KG, Herzogenaurach (DE)

(72) Inventors: Reinhard Stehr, Bühl (DE); Sebastian Köpfler, Bühl (DE); Matthias Finsterbusch, Karlsruhe (DE); Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 280 days.

(21) Appl. No.: 16/618,516

(22) PCT Filed: Jun. 5, 2018

(86) PCT No.: PCT/DE2018/100532
§ 371 (c)(1),
(2) Date: Dec. 2, 2019

(87) PCT Pub. No.: WO2019/001627
PCT Pub. Date: Jan. 3, 2019

(65) Prior Publication Data
US 2020/0124173 A1  Apr. 23, 2020

(30) Foreign Application Priority Data
Jun. 29, 2017 (DE) .......................... 102017114430.7

(51) Int. Cl.
*F16H 61/00* (2006.01)
*F16H 63/30* (2006.01)
*F16H 61/662* (2006.01)

(52) U.S. Cl.
CPC ....... *F16H 63/3023* (2013.01); *F16H 61/662* (2013.01)

(58) Field of Classification Search
CPC ............... F16H 63/3023; F16H 61/662; F16H 61/0031; F16H 61/0021; F16H 61/0025
See application file for complete search history.

(56) References Cited

U.S. PATENT DOCUMENTS 6,219,608 B1   4/2001  Abo et al.
7,766,139 B2*  8/2010  De Maziere ........ F16H 61/0021
                                                        192/3.58

(Continued)

FOREIGN PATENT DOCUMENTS

CN   201588926 U   9/2010
CN   105518351 A   4/2016

(Continued)

*Primary Examiner* — Tisha D Lewis
(74) *Attorney, Agent, or Firm* — Davidson, Davidson & Kappel, LLC

(57) ABSTRACT

A hydraulic system (1) for electro-hydraulically pressing and/or moving a first (8) and a second (9) set of disks of a CVT transmission (10) is provided. The hydraulic system (1) includes two electrically driven hydraulic pumps (4, 5). In order to reduce energy consumption during operation of the hydraulic system, the hydraulic pumps (4, 5) are in the form of self-inhibiting hydraulic pumps (4, 5) which, when a hydraulic pressure is applied and the associated electric drive is switched off, substantially maintain the applied hydraulic pressure as a result of a static friction and a residual moment of the associated electric drive.

17 Claims, 1 Drawing Sheet

(56) References Cited

U.S. PATENT DOCUMENTS

| | | | |
|---|---|---|---|
| 10,364,887 B2 * | 7/2019 | Van Rooij | F15B 11/17 |
| 2012/0122628 A1 | 5/2012 | Frank et al. | |
| 2016/0223077 A1 | 8/2016 | Takahshi et al. | |
| 2016/0290482 A1 * | 10/2016 | Herkommer | F16D 25/10 |
| 2017/0023113 A1 | 1/2017 | Walter | |

FOREIGN PATENT DOCUMENTS

| | | |
|---|---|---|
| CN | 106133398 A | 11/2016 |
| JP | 2008240894 A | 10/2008 |

\* cited by examiner

HYDRAULIC SYSTEM

The present disclosure relates to a hydraulic system for electrohydraulically pressing and/or adjusting a first and a second pulley set of a CVT transmission, having two electromotively driven hydraulic pumps. The present disclosure further relates to a method for actuating two electromotively driven hydraulic pumps in such a hydraulic system.

BACKGROUND

American patent U.S. Pat. No. 6,219,608 B1 discloses an electronic transmission control system for a motor vehicle having a continuously variable automatic transmission which comprises two motor-driven oil pumps.

SUMMARY

It is an object of the present disclosure to reduce the energy consumption during operation of a hydraulic system for electrohydraulically pressing and/or adjusting a first and a second pulley set of a CVT transmission, having two electromotively driven hydraulic pumps.

In a hydraulic system for electrohydraulically pressing and/or adjusting a first and a second pulley set of a CVT transmission, having two electromotively driven hydraulic pumps, in that the hydraulic pumps are configured as self-locking hydraulic pumps which, when a hydraulic pressure is applied and when the respectively associated electromotive drive is switched off, substantially maintain the applied hydraulic pressure as a result of a static friction and of a residual torque of the associated electromotive drive. It is thus possible in a simple manner for the applied pressure to be maintained even without electrical energy. However, during operation of the hydraulic system, unavoidable leakages mean that the applied pressure slowly drops. In order to avoid an undesirably large reduction in the applied hydraulic pressure, the respective hydraulic pump can be started again briefly after reaching a minimum pressure in order to come to a higher pressure level. Corresponding actuating strategies are known for clutches, for example. According to one aspect of the present disclosure, the known actuating strategies are applied to the contact pressure or the transmission ratio of a CVT transmission. The CVT transmission comprises a variator having two pulley sets which are connected to one another by a wraparound means, said pulley sets respectively comprising a fixed pulley and a moving pulley which is movable by applying an axial force via a sliding seat in the axial direction on a variator shaft in order to ensure adequate pressing between the pulley sets and the wraparound means. The capital letters CVT preceding the word transmission stand for the term Continuously Variable Transmission. The two pulley sets of the variator can be coupled to one another for torque transmission by a traction means, such as a chain. The pulleys of the pulley sets are configured as conical pulleys, for example. The distance between the conical pulleys of the respective pulley set or conical pulley pair is variable in order to steplessly vary the transmission ratio of the CVT transmission. The axial direction is defined by an axis of rotation of the respective variator shaft. Axially means in the direction of or parallel to the axis of rotation.

A preferred exemplary embodiment of the hydraulic system is characterized in that the two hydraulic pumps are configured as reversing pumps. This provides the advantage that hydraulic medium can be pumped back and forth in the hydraulic system with two hydraulic pumps. The hydraulic pumps configured as reversing pumps allow the hydraulic medium to be delivered in opposite directions in the hydraulic system. This provides the advantage that the hydraulic system can be operated in a particularly convenient manner.

A further exemplary embodiment of the hydraulic system is characterized in that a hydraulic pressure accumulator is connected in parallel to the hydraulic pumps. There is thus provided in a simple manner an additional hydraulic capacity in the hydraulic system that can prevent a situation in which the applied hydraulic pressure drops excessively during a pump standstill. The hydraulic pressure accumulator makes it possible in a simple manner for undesired pressure fluctuations to be compensated for or reduced during operation of the hydraulic system.

A further preferred exemplary embodiment of the hydraulic system is characterized in that the hydraulic pressure accumulator is connected to a branching which is arranged between the two hydraulic pumps and which is connected to the second pulley set of the CVT transmission. The second pulley set of the CVT transmission is preferably an output-side pulley set of the CVT transmission. Analogously, the first pulley set of the CVT transmission is preferably an input-side pulley set of the CVT transmission. The two pulley sets of the CVT transmission are connected to one another by a wraparound means for torque transmission. The wraparound means is, for example, a chain, in particular a plate link chain. The branching can also be referred to as a hydraulic node or as a hydraulic connection point.

A further preferred exemplary embodiment of the hydraulic system is characterized in that a hydraulic pump, which is configured as a support pump, of the two hydraulic pumps is connected between the first pulley set of the CVT transmission and the branching. The first pulley set can be advantageously supported and adjusted by the hydraulic pump configured as a support pump.

A further preferred exemplary embodiment of the hydraulic system is characterized in that a hydraulic pump, which is configured as a pressing pump, of the two hydraulic pumps is connected between a hydraulic medium reservoir and the branching. The hydraulic pump configured as a pressing pump makes it possible in a simple manner for a desired pressing of the second pulley set onto the wraparound means to be realized. The electromotively driven hydraulic pumps can also be referred to as electric pump actuators for the two pulley sets of the CVT transmission.

A further preferred exemplary embodiment of the hydraulic system is characterized in that a hydraulic resistor which acts only in a charging direction of the hydraulic pressure accumulator is arranged between the branching and the hydraulic pressure accumulator. The hydraulic resistor is, for example, an orifice plate which acts only in the charging direction. The hydraulic resistor acting only in the charging direction of the hydraulic pressure accumulator prevents in a simple manner a situation in which the hydraulic pressure accumulator, which represents an additional capacity of the hydraulic system, delays a pressure increase in the hydraulic system by the hydraulic pumps. The hydraulic resistor acting only in the charging direction of the hydraulic pressure accumulator provides, inter alia, the advantage that the hydraulic pressure accumulator can quickly deliver pressurized hydraulic medium into the hydraulic system. However, by virtue of the hydraulic resistor acting in the charging direction, the hydraulic pressure accumulator can be charged quickly only to a limited degree. However, this supposed disadvantage is knowingly accepted.

A further preferred exemplary embodiment of the hydraulic system is characterized in that a blocking valve which blocks from the branching toward the hydraulic pressure accumulator is arranged between the branching and the hydraulic pressure accumulator parallel to the hydraulic resistor. The blocking valve is configured, for example, as a nonreturn valve and prevents undesired bypassing of the hydraulic resistor during charging of the hydraulic pressure accumulator.

In a method for actuating two electromotively driven hydraulic pumps in an above-described hydraulic system, the above-indicated object is alternatively or additionally achieved in that at least one of the hydraulic pumps, preferably both hydraulic pumps, is/are switched off as soon as the applied hydraulic pressure has reached an upper pressure limit value. After switching off, the applied hydraulic pressure is at first substantially maintained. However, the applied hydraulic pressure then drops as a result of unavoidable leakage losses. The undesired drop in the hydraulic pressure can be compensated for, at least partially, by feeding in pressurized hydraulic medium from the hydraulic pressure accumulator.

A preferred exemplary embodiment of the method is characterized in that at least one of the hydraulic pumps, preferably both hydraulic pumps, is/are switched on again as soon as the applied hydraulic pressure has reached a lower pressure limit value. A difference between the lower pressure limit value and the upper pressure limit value is advantageously rather small, since an undesired variator loss is increased by a hydraulic pressure with the upper pressure limit value using the example of pressing and additionally a higher drive torque is demanded of the respective hydraulic pump.

The method for actuating the two electromotively driven hydraulic pumps advantageously comprises a control hysteresis. The control hysteresis makes it possible to reduce the power consumption of the hydraulic pumps in higher load ranges, that is to say higher pressure ranges. The control hysteresis is preferably a pressure control hysteresis. The control hysteresis is preferably asymmetrical, with the result that the applied hydraulic pressure can be substantially maintained. The control hysteresis can be parameterizable. The method can comprise a hysteresis characteristic map.

BRIEF SUMMARY OF THE DRAWINGS

Further advantages, features and details of the present disclosure will emerge from the following description in which different exemplary embodiments are described in detail with reference to the drawing, in which.

DETAILED DESCRIPTION

Figure 1:
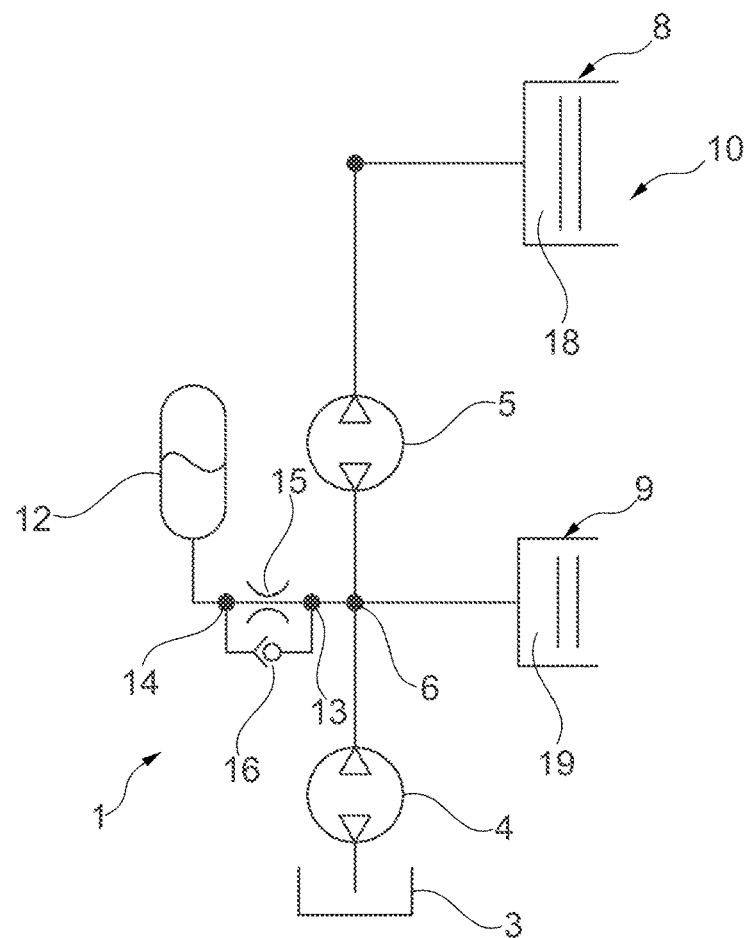
FIG. 1 shows a hydraulic system for electrohydraulically pressing and/or adjusting pulley sets of a CVT transmission, having two electromotively driven hydraulic pumps.

FIG. 1 illustrates a hydraulic system 1 having a hydraulic medium reservoir 3 and two hydraulic pumps 4, 5 in the form of a hydraulic circuit diagram. A hydraulic medium, such as oil, is contained in the hydraulic medium reservoir 3. The hydraulic pump 4 is configured as a reversing pump and, as is indicated by arrow heads, can deliver in opposite delivery directions.

The hydraulic pump 4 is connected between the hydraulic medium reservoir 3 and a branching 6. The branching 6 is a hydraulic branching or a hydraulic node point in which a total of four hydraulic lines open or are connected. Two hydraulic lines connect the two hydraulic pumps 4 and 5 to one another in the branching or the node point 6.

The hydraulic pump 5 is arranged between the branching 6 and a first pulley set 8 of a CVT transmission 10. Extending from the branching 6 is a third hydraulic line to a second pulley set 9 of the CVT transmission 10. Extending from the branching or the node point 6 is a fourth hydraulic line to a hydraulic pressure accumulator 12.

Two further branchings or node points 13, 14 are arranged in the fourth hydraulic line between the branching 6 and the hydraulic pressure accumulator 12. A hydraulic resistor 15 configured as an orifice plate is arranged between the branchings 13 and 14.

The hydraulic resistor 15 configured as an orifice plate acts only in a charging direction of the hydraulic pressure accumulator 12, that is to say from the branching 6 toward the hydraulic pressure accumulator 12. In the reverse direction, the hydraulic resistor 15 configured as an orifice plate has no effect.

A blocking valve 16 is connected parallel to the hydraulic resistor 15 between the branchings 13 and 14. The blocking valve 16 is configured as a nonreturn valve which blocks from the branching 6 toward the hydraulic pressure accumulator 12. The blocking valve 16 configured as a nonreturn valve opens in the opposite direction, with the result that the hydraulic resistor 15 produces no effect in this direction, as is described above.

The two pulley sets 8, 9 represent hydraulic consumers in the hydraulic system 1. These are, for example, hydraulic cylinders each having a piston which is assigned to a variator of the continuously variable conical-pulley wraparound transmission (not shown in further detail).

In order to adjust the variator, the pistons in the hydraulic cylinders are adjusted by supplying or removing a hydraulic volumetric flow. If no adjustment is desired, for example in a constant driving operation, a hydraulic volumetric flow is then also not required. In these states, it is sufficient if a desired hydraulic pressure is maintained in the hydraulic system 1.

If a transmission ratio and a pressing of the variator are constant, no volumetric flow is required meanwhile. Nevertheless, the hydraulic pressure set, that is to say the desired pressing, and/or the corresponding moving pulley position, that is to say the desired transmission ratio, are/is maintained.

According to the present disclosure, the hydraulic pumps are configured as self-locking hydraulic pumps 4, 5. The self-locking hydraulic pumps 4, 5 are used for pressing and/or adjusting the CVT transmission 10.

In order to reduce undesired pressure fluctuations, the hydraulic pressure accumulator 12 is connected in parallel. To ensure that the hydraulic pressure accumulator 12 does not inadmissibly slow down a quick pressure buildup in the hydraulic system, the orifice plate 15 acting only in the charging direction of the hydraulic pressure accumulator 12 is interposed.

The two electromotively driven hydraulic pumps 4, 5, which are also referred to as electric pump actuators, advantageously bring about the pressing and the adjustment of the two pulley sets 8, 9 of the CVT transmission 10. The electromotively driven hydraulic pump 4 is configured as a support pump and advantageously serves for supporting and adjusting the variator. The likewise electromotively driven hydraulic pump 5 is configured as a pressing pump and advantageously serves for pressing the variator.

During operation of the hydraulic system 1, the two hydraulic pumps 4, 5 are used to charge the pressure chambers 18, 19 of the pulley sets 8, 9 with pressurized hydraulic medium. For this purpose, the hydraulic pump 4 configured as a pressing pump delivers a contact pressure to the second pulley set 9 in that said pump presses hydraulic medium from the hydraulic medium reservoir 3 into the pressure chamber 19 of the pulley set 9.

The hydraulic pump 5 configured as a variable displacement pump or support pump changes the variator transmission ratio of the CVT transmission 10 by displacing pressurized hydraulic medium between the pressure chambers 18 and 19 of the pulley sets 8, 9.

The two electromotively driven hydraulic pumps 4, 5 are designed in such a way that, under prevailing or applied pressure, when the electric motor used for driving is switched off, they stand still in a simple manner as a result of their static friction and of the residual torque of the electric motor. The applied or prevailing hydraulic pressure is thus maintained even without electrical energy. The electric motor comprises magnets, which lead to the fact that a rotor of the electric motor locks in at certain angles of rotation and thus generates a certain retaining torque even in a deenergized state.

However, unavoidable leakages slowly reduce the pressure, with the result that, after reaching a minimum pressure, the respective hydraulic pump 4, 5 has to be at least briefly started again in order to come again to a higher pressure level.

Figure 2:
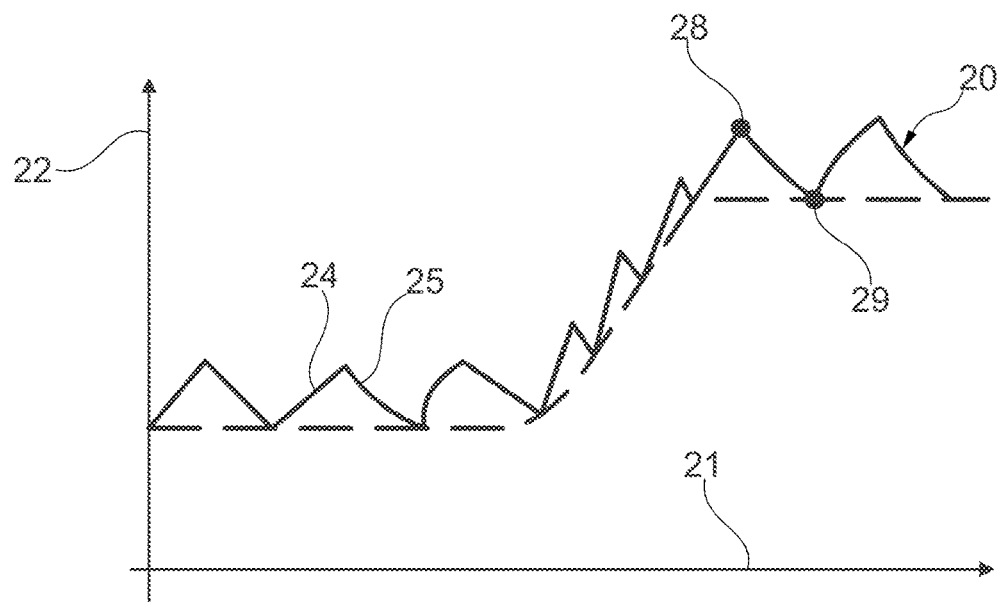
FIG. 2 shows a Cartesian coordinate diagram in which the profile of a pressure applied in the hydraulic system of FIG. 1 is plotted over time.

FIG. 2 illustrates a pressure profile 20 in a Cartesian coordinate diagram. A time t in a suitable time unit is plotted on an x axis 21. A pressure p in a suitable pressure unit is plotted on a y axis 22.

Ascending lines 24 indicate that the pressure increases when the respective hydraulic pump 4, 5 is switched on. Descending lines 25 indicate that the pressure drops when the respective hydraulic pump 4, 5 is switched off. An upper pressure limit value is indicated by a point 28. A lower pressure limit value is indicated by a point 29. A setpoint value for the pressure p is indicated by a dashed line.

It is expedient to keep the interval between the upper pressure limit value 28 and the lower pressure limit value 29 small, since an increased pressure using the example of pressing of increases the variator loss and additionally demands a higher drive torque from the respective hydraulic pump. For a given basic leakage, the difference between the upper limit value 28 and the lower limit value 29 gives the time after which the corresponding hydraulic pump 4, 5 has to be started again.

LIST OF REFERENCE SIGNS

1 Hydraulic system
2 Hydraulic medium reservoir
3 Hydraulic pump
4 Hydraulic pump
5 Branching
8 First pulley set
9 Second pulley set
10 CVT transmission
12 Hydraulic pressure accumulator
14 Branching
15 Hydraulic resistor
16 Blocking valve
18 Pressure chamber
19 Pressure chamber
20 Pressure profile
21 x axis
22 y axis
24 Ascending line
25 Descending line
28 Point
29 Point

What is claimed is:

1. A hydraulic system for electrohydraulically pressing or adjusting a first pulley set and a second pulley set of a CVT transmission, the hydraulic system comprising:
    two electromotively driven hydraulic pumps configured as self-locking hydraulic pumps, the two electromotively driven hydraulic pumps configured such that when a hydraulic pressure is applied and a respective associated electromotive drive is switched off the two electromotively driven hydraulic pumps substantially maintain the applied hydraulic pressure as a result of a static friction and a residual torque of the respective associated electromotive drive.

2. The hydraulic system as claimed in claim 1, wherein the two electromotively driven hydraulic pumps are configured as reversing pumps.

3. The hydraulic system as claimed in claim 1, further comprising a hydraulic pressure accumulator connected in parallel to the two electromotively driven hydraulic pumps.

4. The hydraulic system as claimed in claim 3, wherein the hydraulic pressure accumulator is connected to a branching arranged between the two electromotively driven hydraulic pumps, the branching being connected to the second pulley set of the CVT transmission.

5. The hydraulic system as claimed in claim 4, wherein a first of the two electromotively driven hydraulic pumps is configured as a support pump connected between the first pulley set of the CVT transmission and the branching.

6. The hydraulic system as claimed in claim 5, wherein a second of the two electromotively driven hydraulic pumps is configured as a pressing pump connected between a hydraulic medium reservoir and the branching.

7. The hydraulic system as claimed in claim 4, further comprising a hydraulic resistor configured for acting only in a charging direction of the hydraulic pressure accumulator, the hydraulic resistor being arranged between the branching and the hydraulic pressure accumulator.

8. The hydraulic system as claimed in claim 7, further comprising a blocking valve configured for blocking flow from the branching toward the hydraulic pressure accumulator, the blocking valve being arranged between the branching and the hydraulic pressure accumulator parallel to the hydraulic resistor.

9. A method for actuating the two electromotively driven hydraulic pumps of the hydraulic system as claimed in claim 1, the method comprising:
    switching off at least one of the two electromotively driven hydraulic pumps as soon as the applied hydraulic pressure reaches an upper pressure limit value.

10. The method as claimed in claim 9, wherein the at least one of the two electromotively driven hydraulic pumps is switched on again as soon as the applied hydraulic pressure reaches a lower pressure limit value.

11. A method of constructing a hydraulic system for electrohydraulically pressing or adjusting a first pulley set and a second pulley set of a CVT transmission, the method comprising:
    providing a first electromotively driven self-locking hydraulic pump to deliver a contact pressure from a hydraulic medium reservoir into a pressure chamber of the second pulley set;

providing a second electromotively driven self-locking hydraulic pump to displace pressurized hydraulic medium between a pressure chamber of the first pulley set and the pressure chamber of the second pulley set and connecting a hydraulic pressure accumulator to the first and second electromotively driven self-locking hydraulic pumps via a branching between the first and second electromotively driven self-locking hydraulic pumps, and providing a hydraulic resister and a blocking valve arranged in parallel with each other between the hydraulic pressure accumulator and the branching.

12. The method as recited in claim 11 wherein the first and second electromotively driven self-locking hydraulic pumps are configured such that when a hydraulic pressure is applied and a respective associated electromotive drive is switched off the two electromotively driven hydraulic pumps substantially maintain the applied hydraulic pressure as a result of a static friction and a residual torque of the respective associated electromotive drive.

13. A hydraulic system for electrohydraulically pressing or adjusting a first pulley set and a second pulley set of a CVT transmission, the hydraulic system comprising:

a first electromotively driven self-locking hydraulic pump arranged to deliver a contact pressure from a hydraulic medium reservoir into a pressure chamber of the second pulley set; and a second electromotively driven self-locking hydraulic pump arranged to displace pressurized hydraulic medium between a pressure chamber of the first pulley set and the pressure chamber of the second pulley set, wherein the first electromotively driven self-locking hydraulic pump is configured to maintain pressure in the pressure chamber of the first pulley set after being switched off and the second electromotively driven self-locking hydraulic pump is configured to maintain pressure in the pressure chamber of the second pulley set after being switched off.

14. The hydraulic system as recited in claim 13 further comprising a hydraulic pressure accumulator connected to the first and second electromotively driven self-locking hydraulic pumps via a branching between the first and second electromotively driven self-locking hydraulic pumps.

15. The hydraulic system as recited in claim 14 further comprising a hydraulic resister and a blocking valve arranged in parallel with each other between the hydraulic pressure accumulator and the branching.

16. The hydraulic system as recited in claim 15 wherein the blocking valve is configured as a nonreturn valve which blocks in a first direction from the branching toward the hydraulic pressure accumulator and opens in a second direction opposite the first direction, the hydraulic resistor producing no effect in the second direction.

17. The hydraulic system as recited in claim 14 further comprising a first hydraulic line extending from the branching to the first electromotively driven self-locking hydraulic pump, a second hydraulic line extending from the branching to second first electromotively driven self-locking hydraulic pump, a third hydraulic line extending from the branching to the pressure chamber of the second pulley set, and a fourth hydraulic line extending from the branching to the hydraulic pressure accumulator.

* * * * *